United States Patent
Walters et al.

[15] 3,648,813
[45] Mar. 14, 1972

[54] AUTOMATIC CLUTCH-WEAR COMPENSATOR

[72] Inventors: Leslie K. Walters, Rochester; Walter K. Fuelberth, Warren, both of Mich.

[73] Assignee: General Motors Corporation, Detroit, Mich.

[22] Filed: Feb. 24, 1970

[21] Appl. No.: 13,593

[52] U.S. Cl. ............................ 192/111 A, 192/99 S, 192/38, 188/196 RR, 188/79.5 K, 188/82.84
[51] Int. Cl. ........................................................... F16d 13/60
[58] Field of Search ................................ 192/111 A, 99 S, 38; 188/82.84, 196 RR, 79.5 K; 64/29

[56] References Cited

UNITED STATES PATENTS 3,429,412   2/1969   Wobrock ............................ 192/111 A

*Primary Examiner*—Mark M. Newman
*Assistant Examiner*—Randall Heald
*Attorney*—Warren E. Finken, A. M. Heiter and John P. Moran

[57] ABSTRACT

A clutch disc-wear compensator wherein an outer race member, rotatable by a clutch pedal, includes a plurality of oppositely disposed, internally formed cam surfaces which contact one set of rollers during depression of the clutch pedal and another set of rollers during retraction of the clutch pedal. The rollers become alternately wedged between the cam surfaces and an inner race which, through suitable shaft and linkage members, rotates to alternately engage and disengage the usual clutch discs. Fixed pin members are coordinated with the cam surfaces and the rollers, such that during a portion of the total rotation of the outer race resulting from each retraction of the clutch pedal, the pin members stop the rollers, freeing the inner race and permitting the inner race to be rotated independently of the outer race by the linkage from the clutch an amount commensurate with any additional movement required, as a result of wear, for the clutch discs to engage, the inner race thereby assuming a new rotary position relative to the outer race without affecting the original clutch pedal free travel or lash.

10 Claims, 7 Drawing Figures

PATENTED MAR 14 1972

INVENTORS
Leslie K. Walters &
BY Walter K. Fuelberth

John P. Moran
ATTORNEY

INVENTORS
Leslie K. Walters &
BY Walter K. Fuelberth

John P. Moran
ATTORNEY

AUTOMATIC CLUTCH-WEAR COMPENSATOR

This invention relates to a friction control linkage and more particularly to compensating means for automatically providing a predetermined constant free travel movement of an operator member prior to the control thereby of a friction unit regardless of the amount of wear of selectively engageable and disengageable friction unit clutch plates or discs.

In automotive vehicles it is generally the practice to provide a friction unit, such as a friction clutch, having driving and driven discs to alternately connect and disconnect the vehicle engine from the power transmission. The friction clutch discs, when disengaged, allow the engine to develop sufficient torque to initially move the vehicle. When upshifting or downshifting, the engine is disconnected from the load to permit smooth shifts. A clutch control linkage, which extends from a clutch release lever to the operator compartment, provides a mechanism allowing the operator to control the application of the clutch. When initially moving the vehicle, for example, relative slippage of the clutch discs is desired to permit engine power to be gradually applied to the load, thereby enhancing smooth vehicle operation. After this gradual application of the clutch, the clutch discs are frictionally coupled, with no slippage, for transmittal of full engine power to the transmission.

In these linkages there is generally provided free pedal travel which is the arcuate distance through which the clutch pedal must move before the linkage is actuated to initiate disengagement of the clutch. The main purpose of this free pedal travel is to insure that the clutch is fully engaged when the clutch pedal is released. If free pedal travel were not provided for in such linkages, it would be possible at times for the clutch pedal, when fully retracted, to prevent complete clutch engagement. This becomes more likely as the frictional faces of the clutch discs wear. If such were the case, there would be relative motion between the drive and driven clutch discs with the clutch pedal fully released, resulting thereafter in rapid clutch wear, inefficient torque transmittal and marginal vehicle operation.

To prevent the possibility of only partial engagement of the clutch discs when partially worn, free pedal travel adjustment devices are generally utilized in the linkages between the clutch pedal and the clutch. These devices are adjusted periodically, as required by clutch disc wear conditions, to insure that the clutch is fully engaged when the pedal is released. Although providing for free pedal travel, many prior art devices did not provide for a constant amount of free travel.

Accordingly, an object of the invention is to provide an improved clutch-wear compensator in which there is incorporated a self-adjusting feature which provides for a constant amount of free pedal travel regardless of the amount of clutch wear, thereby insuring full clutch engagement upon release of the operator pedal.

Another object of the invention is to provide an improved clutch-wear compensator wherein the lash or free pedal travel is continuously maintained exactly as set.

A further object of the invention is to provide an improved control linkage wherein the throwout bearing is moved a constant amount away from the clutch pressure plate fingers during the retraction of the clutch pedal, regardless of clutch disc wear, thereby preserving throwout bearing life.

A still further object of the invention is to provide a clutch-wear compensator wherein an outer race or housing member and an inner race member are intermittently free of one another during a predetermined rotary movement of the housing member by depression of the clutch pedal, permitting the inner race member to be rotatively adjusted relative to the outer race by suitable linkage to compensate for any wear of the clutch discs.

These and other objects and advantages will become apparent when reference is made to the following specification and drawings, wherein.

Figure 1:
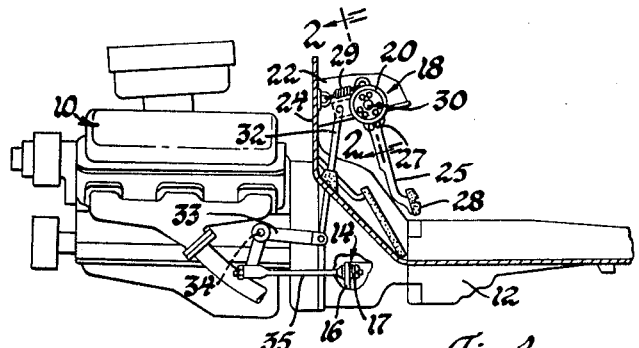
FIG. 1 is a side elevational view of an engine and transmission assembly embodying the invention.

Referring to the drawings in greater detail, FIG. 1 illustrates a vehicle engine 10 coupled to a manual transmission 12 through a clutch assembly 14 having an outwardly extending release fork 16 connected thereto by a pivot 17 for controlling the release of the clutch 14 and thereby the flow of power from the vehicle engine 10 to the transmission 12. An automatic clutch-wear compensator 18 includes an outer race or cylindrical housing 20 rotatably connected to an inverted, substantially U-shaped brace or bracket 22 extending from the vehicle firewall 24, as will be described. A clutch pedal lever 25, secured to a tab 26 formed on the outer surface of the cylindrical housing 20 in any suitable manner, such as by bolts 27, extends downwardly therefrom into the operator compartment. A clutch pedal 28 is secured to the free end of the lever 25 for manual rotary actuation by the vehicle operator. Resilient means, such as a return spring 29, serves to urge the outer race 20, the clutch lever 25 and the clutch pedal 28 toward the right-hand position "A" illustrated in FIG. 4. The clutch-wear compensator 18 is operatively connected via a central shaft 30, a lever arm 31, and a push rod 32 to a bell crank 33 which is pivotably mounted on a fixed pin 34. A second push rod 35 is pivotably connected between the bell crank 33 and the clutch release fork 16.

Figure 2:
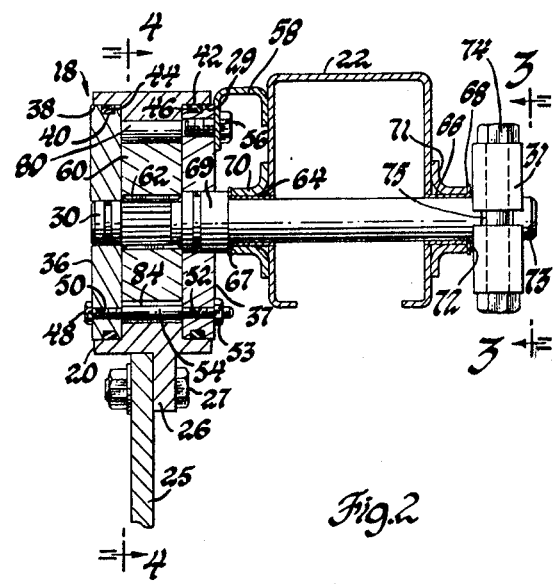
FIG. 2 is a fragmentary cross-sectional view taken along the plane of line 2—2 of FIG. 1, and looking in the direction of the arrows.

Referring now to FIG. 2, the cylindrical outer race 20 is seen to be rotatably mounted on the front and rear cover members 36 and 37, respectively, the latter members being fitted into annular recesses 38 and 39, respectively, formed adjacent the end faces of the cylindrical housing 20. Seal rings 40 and 42 are mounted in grooves 44 and 46 formed around the outer periphery of the cover members 36 and 37, respectively, for sliding contact with the surfaces 38 and 39 of the cylindrical outer race 20. A plurality of bolts 48 extend through a plurality of aligned openings 50 and 52 formed in the respective cover members 36 and 37 and are secured therein by nuts 53. Close fitting sleeve members 54 are mounted on the bolts 48 intermediate the adjacent faces of the cover members 36 and 37 to serve as stationary pins for a function to be described. The cover member 37 is fixed against rotation by being secured by bolts 56 to a bracket 58 which, in turn, is secured to the brace or bracket 22.

Figure 3:
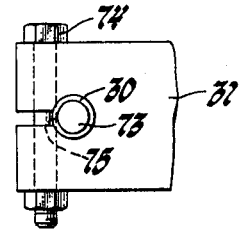
FIG. 3 is an enlarged fragmentary end view taken along the plane of line 3—3 of FIG. 2, and looking in the direction of the arrows.

A disc-shaped member or inner race 60 is rotatably mounted between the cover members 36 and 37 on the compensator shaft 30 to which it is connected by splines 62. The shaft 30 extends through suitable bushings 64 and 66. The bushings 64 and 66 are mounted adjacent the outside surfaces of the U-shaped bracket 22, and serve as thrust bearings also, by virtue of the flanges 67 and 68, respectively formed thereon. The flange 67 is confined between a collar 69 on the shaft 30 and a brace 70 secured to the U-shaped bracket 22. The flange 68 is confined between brace 71 secured to the other side of the bracket 22 and a retainer 72 mounted on the shaft 30. The lever arm 31 is secured adjacent the end 73 of the compensator shaft 30 by means of a nut and bolt 74 (FIG. 3) inserted through a spread portion (FIG. 2) of the lever arm 31 and across a slot 75 formed on the shaft 30 adjacent the end 73. The lever arm 31 is connected, as indicated above, via the upper push rod 32, the pivotable bell crank 33 (FIG. 1) and the lower push rod 35 to the conventional clutch release fork 16 extending from the clutch assembly 14.

Figure 4:
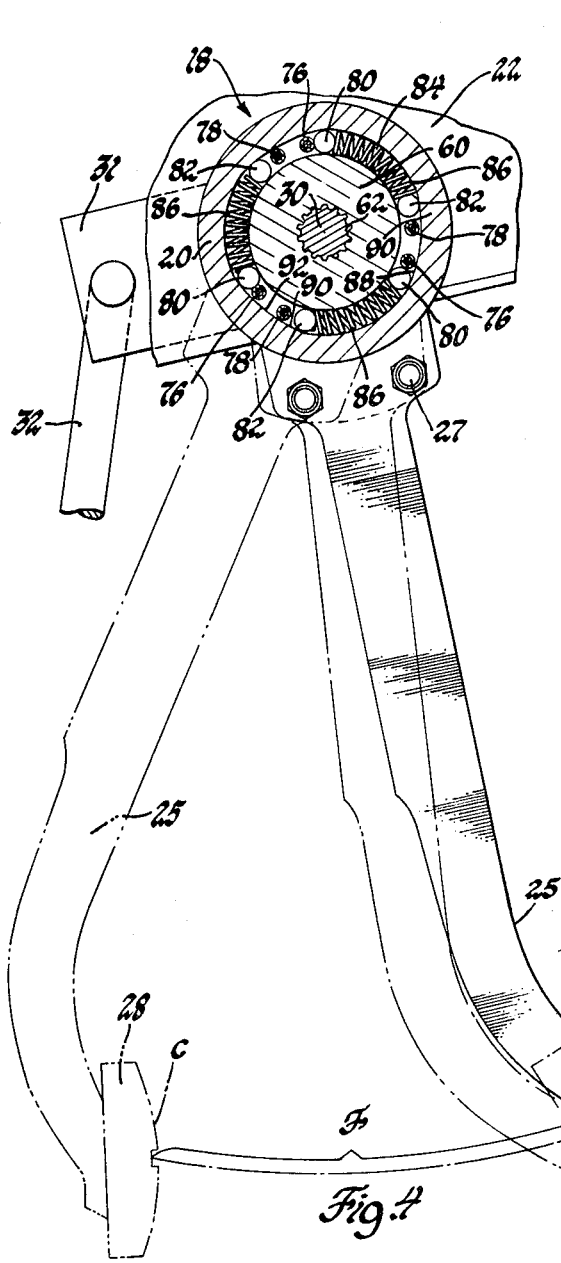
FIG. 4 is an enlarged fragmentary cross-sectional view taken along the plane of line 4—4 of FIG. 2, and looking in the direction of the arrows.

As illustrated in FIG. 4, the fixed pins formed by the plurality of bolts 48 and the sleeve members 54 are six (6) in number and constitute three (3) pairs of spaced pins which, for purposes of clarity, hereinafter are designated as 76 and 78. Three sets of two rollers 80 and 82 are mounted in an annular space 84 between the outer surface of the inner race 60 and the inner surface of the outer race 20, and are urged apart and toward the pins 76 and 78, respectively, by suitable biasing means, such as springs 86. Cam surfaces 88 and 90 are formed on the inner surface 92 of the cylindrical outer race 20 adjacent each roller 80 and 82, respectively, for alternately wedging the rollers 80 and 82 between the respective cam surfaces 88 and 90 and the inner race 60.

Figure 5:
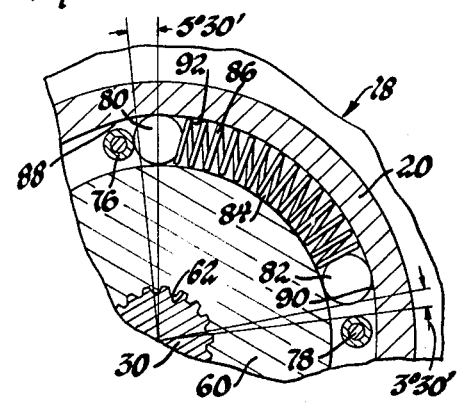
FIG. 5 is an enlarged portion of the FIG. 4 structure.

FIG. 5 is an enlarged view of a portion of FIG. 4 and illustrates that, with the clutch pedal 28 and the outer race 20 in the positions shown in FIG. 4, each roller 80 will be urged by each spring 86 against the adjacent pin 76 and that the cam surface 88 will be spaced 5° 30' away from contact with the roller 80. At the same time, each of the rollers 82 will be wedged between the respective cam surfaces 90 and the inner race 60, and will be spaced 3° 30' away from contact with the respective pin 78.

Figure 6:
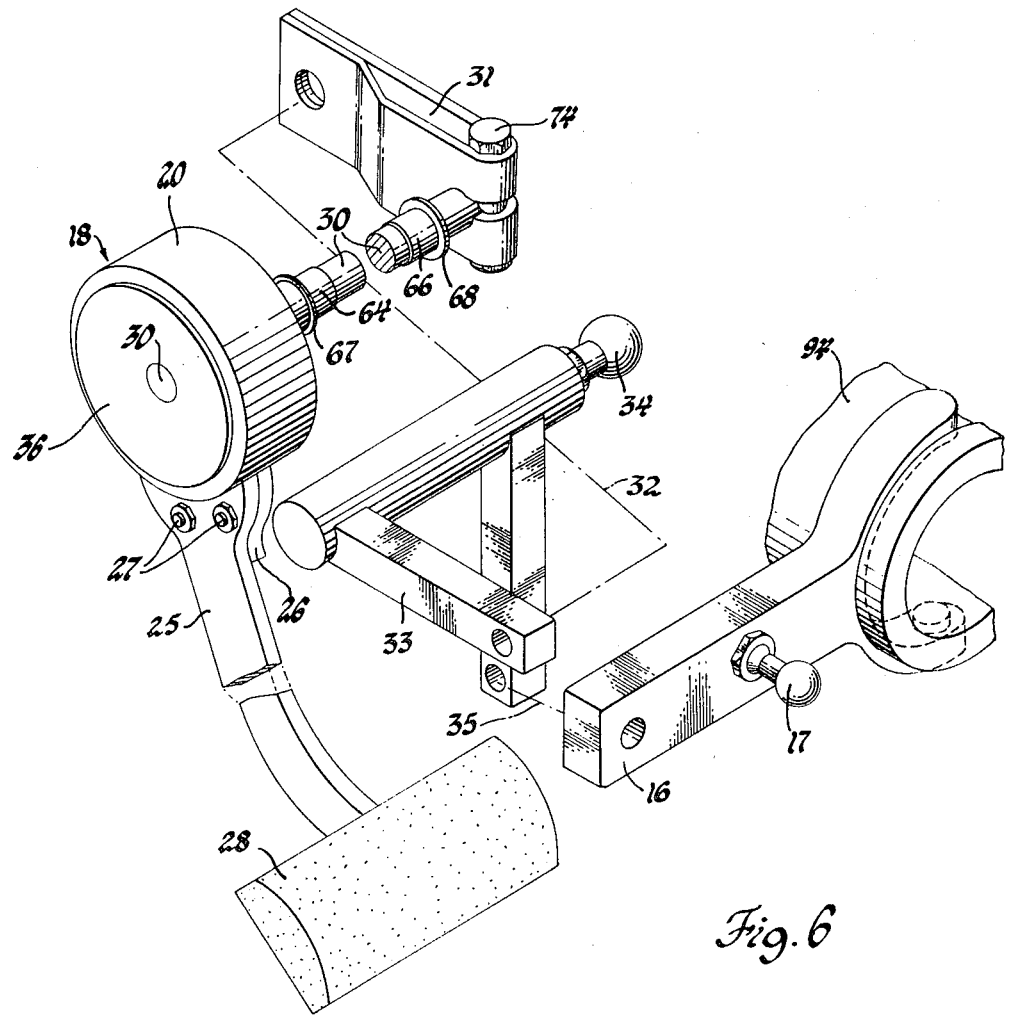
FIG. 6 is a perspective view of the linkage members between the compensator mechanism and the clutch throwout bearing.

FIG. 6 illustrates in perspective the linkage system shown in FIG. 1 and includes additionally a conventional clutch throwout bearing 94 rotatably mounted on one end of the clutch release fork 16. The pivot member 17 is pivotably secured to a suitable fixed portion of the vehicle.

Figure 7:
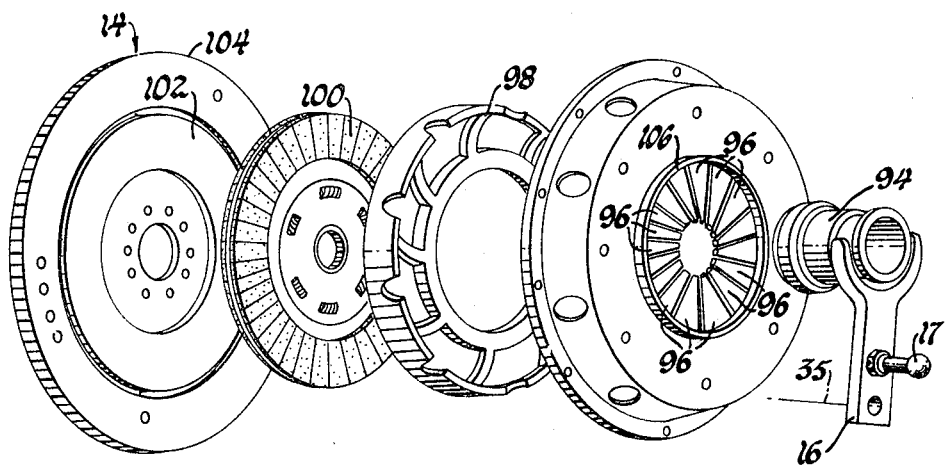
FIG. 7 is a perspective view of the components of the clutch associated with the throwout bearing.

FIG. 7 illustrates in perspective the clutch throwout bearing 94 being positioned adjacent the inner edges of the conventional clutch pressure plate-actuating fingers 96, the outer edges of which are secured in any suitable manner to a conventional spring-loaded pressure plate 98 located adjacent the clutch driven discs 100. The driven discs 100 are, of course, associated with driving discs 102 and the usual flywheel 104 in the well-known manner, the spring-loaded pressure plate 98 urging the driven discs 100 into engagement with the driving discs 102. The fingers 96 pivot at an intermediate radial point between the ends thereof about a pivot ring 106.

OPERATION

As may be noted in FIGS. 1 and 4, depression of the clutch pedal 28 to the left from the position "A" (FIG. 4), will, via the lever 25, rotate the automatic clutch-wear compensator outer race 20 in a clockwise direction as viewed in FIG. 4. During the clockwise rotation of the outer race 20, after a predetermined set lash or free travel rotation of, say, 5° 30' (FIG. 5), corresponding to the arcuate distance "L" (FIG. 4), of the clutch pedal 28 to the beginning position "B" of the disengaging process, the rollers 80 become wedged between the cam surfaces 88 and the inner race 60, and thereby cause the inner race 60 to rotate in a clockwise direction along with the outer race 20. The pins 76 and 78 are fixed against rotational movement, as indicated above, and thus, after the outer race 20 has rotated through its first 3° 30', and the springs 86 have urged the rollers 82 forward a like distance, the pins 78 stop the rollers 82 and hold them in a stationary disengaged position during the further clockwise rotation (FIG. 4) of the pedal 28, the lever 25 and the outer race 20.

It is apparent from FIG. 5 that, once the rollers 82 have traveled through 3° 30' and contacted the pins 78, the cam surfaces 88 will still have to rotate two (2) additional degrees before contacting their respective rollers 80, causing the latter to become wedged between the cam surfaces 88 and the inner race 60 to thereafter rotate the inner race 60 along with the outer race 20 while the clutch pedal 28 travels through the arcuate distance "F" (FIG. 4) toward the fully disengaged position "C."

It should be noted that the 3° 30' and 5° 30' arcuate distances are not critical and could be modified to suit the space and linkage ratio conditions. However, it is essential that substantially a 2° differential therebetween be maintained to allow automatic adjustment or compensation for any wear of the clutch friction material, as will be further explained.

Since the inner race 60 is secured by splines 62 to the compensator shaft 30, once the cam surfaces 88 contact the rollers 80, the shaft 30 will be rotated within the bushings 64 and 66 (FIG. 2) which, in turn, are mounted within the braces 70 and 71 adjacent the outer surfaces of the firewall bracket 22. Rotation of the shaft 30 in this manner will rotate the lever arm 31 which is secured adjacent the end 73 thereof. Now, since the lever arm 31 is operatively connected in the manner described above and illustrated in FIG. 6 to the conventional throwout bearing 94 adjacent the pressure plate-actuating fingers 96 of the clutch assembly 14, it is apparent that the latter may be set such that they come into contact with the fingers 96 at the end of the free travel or lash distance "L" (position "B" of the clutch pedal 28). Thereafter, while the clutch pedal 28 is moving through the distance "F," the outer and inner races 20 and 60, respectively, will continue in a clockwise direction, compressing the springs 86 between the moving rollers 80 and the stationary rollers 82, and the driven discs 100 (FIG. 7) will be forced away from the driving discs 102 by virtue of the throwout bearing 94 being pressed against the inner ends of the fingers 96 to pivot the fingers 96 about the pivot ring 106, thereby withdrawing the pressure plate 98 away from the discs 100 to disengage the clutch assembly 14.

After the desired manual shift has been completed in the transmission, the operator will have released the clutch pedal 28, permitting the usual return spring 29 to rotate the pedal 28 in a counterclockwise direction from its leftmost position in FIG. 4. Counterclockwise movement of the pedal 28 will rotate the compensator outer race 20 via the lever 25 in a counterclockwise direction, permitting the springs 86 to urge the rollers 80 toward the pins 76, the rollers 80 remaining in contact with the adjacent counterclockwise rotating cam surfaces 88 and forcing the inner race 60 to rotate in a counterclockwise direction therewith. Once the clutch pedal 28 has returned to the beginning of the lash distance "L," the rollers 80 will have contacted the pins 76 once again, and the inner race 60 will be freed until the outer race 20 has undergone two (2) additional degrees of travel, as previously indicated, at which time the cam surfaces 90 would come into contact with their respective rollers 82 and carry them through the 3° 30' illustrated in FIG. 5, while the pedal 28 correspondingly moves back through the lash distance "L" to the extreme right-hand position "A" illustrated in FIG. 4.

It is during the return 3° 30' rotational movement that the throwout bearing 94 will have moved away from the clutch pressure plate fingers 96 a constant amount, regardless of the position of the inner edges of the fingers 96, such position varying with wear of the clutch discs 100 and 102, resulting in increased bearing life as compared to prior usage wherein the position of the throwout bearing is fixed. If fixed, the bearing can become wedged between the clutch fingers 96 and the release fork 16 when disc wear is encountered. Such wedging would cause the bearing 94 to be continuously rotated by the clutch fingers 96, thereby shortening the bearing life. Common practice currently is to manually adjust the length of the push rod 35 in order to cause the linkage members between the rod 35 and the usual clutch pedal and the clutch pedal itself to return to their respective original positions.

Now, it may be realized that during the 2° rotation of the outer race 20, while the inner race 60 is completely "free" or unaffected thereby, any wear of the driven clutch discs 100 and the associated driving clutch discs 102 of the clutch assembly 14 is able to be referred back through the respective linkage members and the compensator shaft 30 to the inner race 60. This is accomplished in the following manner.

When worn, it may be realized that the driven discs 100 must move farther under the action of the pressure plate 98, in order to engage the driving discs 102. Since the fingers 96 are connected at their outer ends to the pressure plate 98, the innermost ends thereof will be pivoted about the pivot ring 106 such that they extend farther rearwardly toward the release fork 16 while still contacting the throwout bearing 94. The resultant additional rearward movement of the throwout bearing 94 under such contact will cause the release fork 16 to pivot about the pivot pin 17 so as to move the push rod 35 farther to the left in FIGS. 6 and 7. This, in turn, will rotate the bell crank 33 of FIG. 6 such that the end thereof, which is connected to the push rod 32, will be moved downwardly in FIG. 6 about the pivot pin 34, thereby pulling the lever arm 31 downwardly, rotating the compensator shaft 30 in a counterclockwise direction in FIG. 6. Since the compensator shaft 30 is splined (FIG. 4) to the inner race 60, the latter will likewise rotate some distance in a counterclockwise direction. This, of course, will be occurring during the two (2) degrees of rotation of the outer race 20 while the inner race 60 is free therefrom. Once the inner race 60 has been adjusted in the above manner, the outer race 20 and the inner race 60 once again begin rotating together by virtue of the rollers 82 becoming wedged therebetween for the remaining 3° 30' movement, the clutch pedal 28 will have returned to position "B," i.e., at the bottom of the free travel or lash at the left end of the arcuate distance "L" of FIG. 4. The clutch pedal 28 will thereafter move through the distance "L" to its starting position "A," with the cam surfaces 88 leaving contact with the rollers 80 and traveling to the 5° 30' arcuate distance away from the contact point with the rollers 80, illustrated in FIG. 5, to await the next depression of the pedal 28.

It should be apparent that the above-described clutch-wear compensator provides an improved automatic means for ensuring that, with any increment of wear of the clutch discs, a relative compensating movement of components will occur in order to permit the conventional clutch pedal to retain its originally set lash distance, while at the same time eliminating improper throwout bearing wear.

While but one embodiment of the invention has been shown and described, other modifications thereof are possible.

We claim:

1. A friction-engaging and wear-compensating device comprising a clutch including driving and driven discs, spring-loaded pressure means urging said driving and driven discs into engagement, pedal means, wear-compensating means operatively connected to said pedal means, and linkage means operatively connected between said wear-compensating means and said pressure means, said wear-compensating means including first and second relatively rotatable members, said first member being rotatable at all times by said pedal means, and intermediate means for at times during each stroke of said pedal means causing said second member to rotate with said first member to disengage said driving and driven discs and for at times during each stroke of said pedal means freeing said second member from said first member for permitting said spring-loaded pressure means to refer any variation in position caused by wear of said discs back through said linkage means to said second member, thereby adjusting the position of said second member relative to said first member prior to said second member rotating once again with said first member, said intermediate means including cooperating cam surfaces and rollers for at times wedging said rollers between said first and second relatively rotatable members for rotating said members together.

2. The device described in claim 1, wherein said intermediate means further includes stationary pin members for at times stopping said rollers and freeing said first and second members.

3. The device described in claim 1, wherein said cam surfaces are formed at first predetermined spaced intervals on said first member with fixed pin means mounted at second predetermined spaced intervals adjacent said spaced cam surfaces, said rollers consisting of first and second rollers located intermediate said first and second members and between two of said fixed pin means with biasing means for urging said first and second rollers apart and toward said adjacent fixed pin means, said first and second members being rotatable together upon contact of either of said rollers by one of said cam surfaces, said contact causing one of said rollers to become wedged between said first and second members, said freeing of said second member from said first member occurring when said cam surfaces are not in contact with said rollers.

4. A friction-engaging and wear-compensating device comprising a clutch including driving and driven discs, spring-loaded pressure means urging said driving and driven discs into engagement, pedal means, and linkage means operatively connected between said pedal means and said pressure means, said pedal means serving when depressed to actuate said linkage means to release said pressure means from said discs thereby disengaging said discs, said linkage means including first and second relatively rotatable concentric members, said first member being rotatable by said pedal means and said second member being connected to said pressure means for actuation thereof, and means intermediate said first and second rotatable members for at times automatically connecting said second rotatable member to said first rotatable member for rotation therewith through a predetermined arcuate distance, and at times disconnecting said first and second members and thereby permitting any wear of said discs to be referred back through said linkage means to said second rotatable member during each stroke of said pedal means, causing said second member to move through an arcuate distance corresponding to said wear, said intermediate means including a plurality of wedged surfaces formed on said first rotatable member, a plurality of roller members between said first and second rotatable members for at times being contacted by said wedged surfaces to drive said first and second rotatable members together, and a plurality of stationary members for at times being contacted by said roller members and freeing said second rotatable member from said first rotatable member while said first rotatable member rotates through a predetermined arcuate distance.

5. A friction-engaging and wear-compensating device comprising driving and driven clutch discs, a spring-loaded pressure plate urging said driving and driven discs into engagement, pivotally mounted clutch fingers secured at one end thereof to said pressure plate, a pivotally mounted release fork, a throwout bearing rotatably mounted on said release fork adjacent the other end of said pivotally mounted fingers, a clutch pedal, a clutch disc-wear compensator mechanism operatively connected to said clutch pedal, linkage members operatively connected between said clutch disc-wear compensator mechanism and said release fork, said throwout bearing being movable into contact with said fingers upon depression of said clutch pedal to actuate said wear compensator mechanism and said linkage members and thereby move said pressure plate to disengage said driving and driven discs, said clutch disc-wear compensator mechanism including concentric, intermittently concurrently operative dual race means wherein the inner race thereof is adapted to be repositioned relative to the outer race thereof and to said clutch pedal during each stroke of said clutch pedal in response to the additional travel of said pressure plate resulting from wear of said discs and transferred to said inner race from said pressure plate through said linkage members, permitting the free pedal travel of said clutch pedal to remain constant.

6. A friction-engaging and wear-compensating device comprising driving and driven clutch discs, a spring-loaded pressure plate urging said driving and driven discs into engagement, pivotally mounted clutch fingers secured at one end thereof to said pressure plate, a pivotally mounted release fork, a throwout bearing rotatably mounted on said release fork adjacent he other end of said pivotally mounted fingers, a clutch pedal, a clutch disc-wear compensator mechanism including an outer race member operatively connected to said clutch pedal and an inner race member operatively connected to said release fork, said throwout bearing being movable into contact with said fingers upon depression of said clutch pedal to actuate said outer and inner race members and said release fork and to thereby move said pressure plate to disengage said driving and driven discs, said inner race member being independently rotatable in response to the amount of wear of said discs during each depression and release of said clutch pedal and thereby repositioned relative to said outer race member for causing said throwout bearing to move a constant distance apart from said clutch fingers after each depression and release of said clutch pedal regardless of the repositioning of said fingers as a result of wear of said discs.

7. A friction-engaging and wear-compensating device comprising driving and driven clutch discs, a spring-loaded pressure plate urging said driving and driven discs into engagement, pivotally mounted clutch fingers secured at one end thereof to said pressure plate, a pivotally mounted release fork, a throwout bearing rotatably mounted on said release fork adjacent the other end of said pivotally mounted fingers, a clutch pedal, an outer race member secured to said clutch pedal for rotation therewith, an inner race member rotatably mounted within said outer race member, a plurality of cam surfaces formed on the inner surface of said outer race member, a roller positioned between said inner and outer race members adjacent each cam surface, linkage members operatively connected between said inner race member and said release fork, said throwout bearing being movable into contact with said fingers upon depression of said clutch pedal to actuate said outer race member and cause said rollers to become wedged between said cam surfaces and said inner race to rotate said inner race and said linkage members and thereby move said pressure plate to disengage said driving and driven discs, pin means adjacent said rollers for at times unwedging said rollers, freeing said inner race member from said outer race member and permitting said inner race member to rotate in response to the additional travel of said pressure plate resulting from wear of said discs and transferred thereto from said pressure plate through said linkage means, permitting the free pedal travel of said clutch pedal to remain constant.

8. The device described in claim 7, wherein said linkage means includes a shaft extending from said inner race member, a lever arm secured to said shaft, a first push rod pivotally connected to said lever arm, a bell crank pivotally connected to said first push rod, and a second push rod pivotally connected between said bell crank and said release fork.

9. For use with a friction-engaging device, the combination comprising engaging means urgable through an engaging stroke to engage said device and through a disengaging stroke to disengage said device, biasing means normally biasing said engaging means to engage said device, and wear-compensator means operatively connected to said engaging means and to said friction-engaging device and including housing means secured to said engaging means and rotatable thereby, cam means formed in spaced relationship around an inside surface of said housing means, a rotary member mounted in said housing means and operatively connected to said friction-engaging device, and adjusting means cooperable with said cam means and said rotary member for alternately driving and freeing said rotary member upon rotation of said housing means to adjust the rotary position of said rotary member as required to compensate for any wear of said friction-engaging device, said adjusting means including at least two spaced fixed pins; two movable pins positioned between said two fixed pins; spring means urging said movable pins apart and toward said respective fixed pins; said two movable pins being of a size which, when either of said movable pins is contacted by said cam means, said contacted movable pin becomes wedged between a portion of said cam means and said rotary member to move said rotary member with said housing means in response to actuation of said engaging means, said rotary member being adjustable by said friction-engaging device when said cam means is not contacting either of said movable pins.

10. For use with a friction-engaging device, the combination comprising engaging means urgable through a disengaging stroke to disengage said device and retractable to engage said device; biasing means normally biasing said engaging means to engage said device; an outer race member secured to said engaging means for rotation thereby; an inner race member rotatably connected to said friction-engaging device; intermediate means between said outer race member and said inner race member for rotating said inner race member with said outer race member for a predetermined first arcuate movement of said outer race member, releasing said inner race member from said outer race member for a predetermined second arcuate movement of said outer race member, thereby freeing said inner race member for adjustment thereof in response to any wear of said friction-engaging device to maintain the lash of said engaging means constant, and again rotating said inner race member with said outer race member for a predetermined third arcuate movement of said outer race member, said intermediate means including a plurality of spaced pairs of fixed pin members, a plurality of pairs of spaced cam surfaces formed on said outer race member, a plurality of pairs of spaced rollers for being alternately wedged and freed between said outer race member and said inner race member during each engaging stroke of said engaging means, and biasing means between each pair of said plurality of pairs of spaced rollers for urging said rollers apart and for urging one of each pair of rollers toward one of each pair of fixed pins upon rotary movement of said outer race member by said engaging means during each engaging stroke of said engaging means and urging the other of each pair of rollers toward the other of each pair of fixed pins upon rotary movement of said outer race member during each retraction.

* * * * *